United States Patent [19]

Sprunger

[11] 4,244,237
[45] Jan. 13, 1981

[54] TILT STEERING COLUMN MECHANISM

[75] Inventor: Loren G. Sprunger, Fort Wayne, Ind.

[73] Assignee: International Harvester Company, Chicago, Ill.

[21] Appl. No.: 42,746

[22] Filed: May 29, 1979

[51] Int. Cl.³ .......................... B62D 1/18; G05G 5/06
[52] U.S. Cl. ........................................ 74/493; 74/527; 403/96
[58] Field of Search .................... 74/493, 527; 403/96, 403/98

[56] References Cited

U.S. PATENT DOCUMENTS

| | | | |
|---|---|---|---|
| 2,873,822 | 2/1959 | Sloan | 74/527 X |
| 2,936,652 | 5/1960 | Gunzner | 74/527 |
| 3,991,633 | 11/1976 | Molnar | 74/527 X |

FOREIGN PATENT DOCUMENTS

| | | | |
|---|---|---|---|
| 853500 | 10/1970 | Canada | 74/493 |
| 1949241 | 9/1969 | Fed. Rep. of Germany | 74/493 |

Primary Examiner—Allan D. Herrmann
Attorney, Agent, or Firm—Raymond E. Parks; Frederick J. Krubel; F. David AuBuchon

[57] ABSTRACT

A tilt steering column mechanism having two brackets, one of which is connected to a cab frame member and the other of which is connected to a steering column and is slideable within the first bracket upon tilting or pivoting of the steering column about a point remote from the second bracket. The first bracket carries a slideable lock bolt, which is spring-biased on opposite ends in opposite axial directions by a plurality of springs of differing magnitude, and has a raised frusto-conical portion thereon which cooperates with any one of a number of uniformly spaced frusto-conical receptacles provided in the second bracket. A handle, fixedly mounted to one end of the lock bolt causes the sliding of the lock bolt through the intermediary of a rotary cam and pin follower, which pin follower, in the raised cam land position, against the bias of the springs, holds the frusto-conical portion in the selected frusto-conical receptacle. The steering column is pivoted to predetermined points, corresponding to the frusto-conical receptacle spacing, about a horizontal axis, upon releasing the loading on the springs by rotating the handle about the axis of the lock bolt and moving the cam follower to the lowered cam land position, thereby causing the springs of greater magnitude to move and slide the lock bolt against the bias of the springs of lesser magnitude and unseat the frusto-conical portions from their respective frusto-conical receptacles.

7 Claims, 6 Drawing Figures

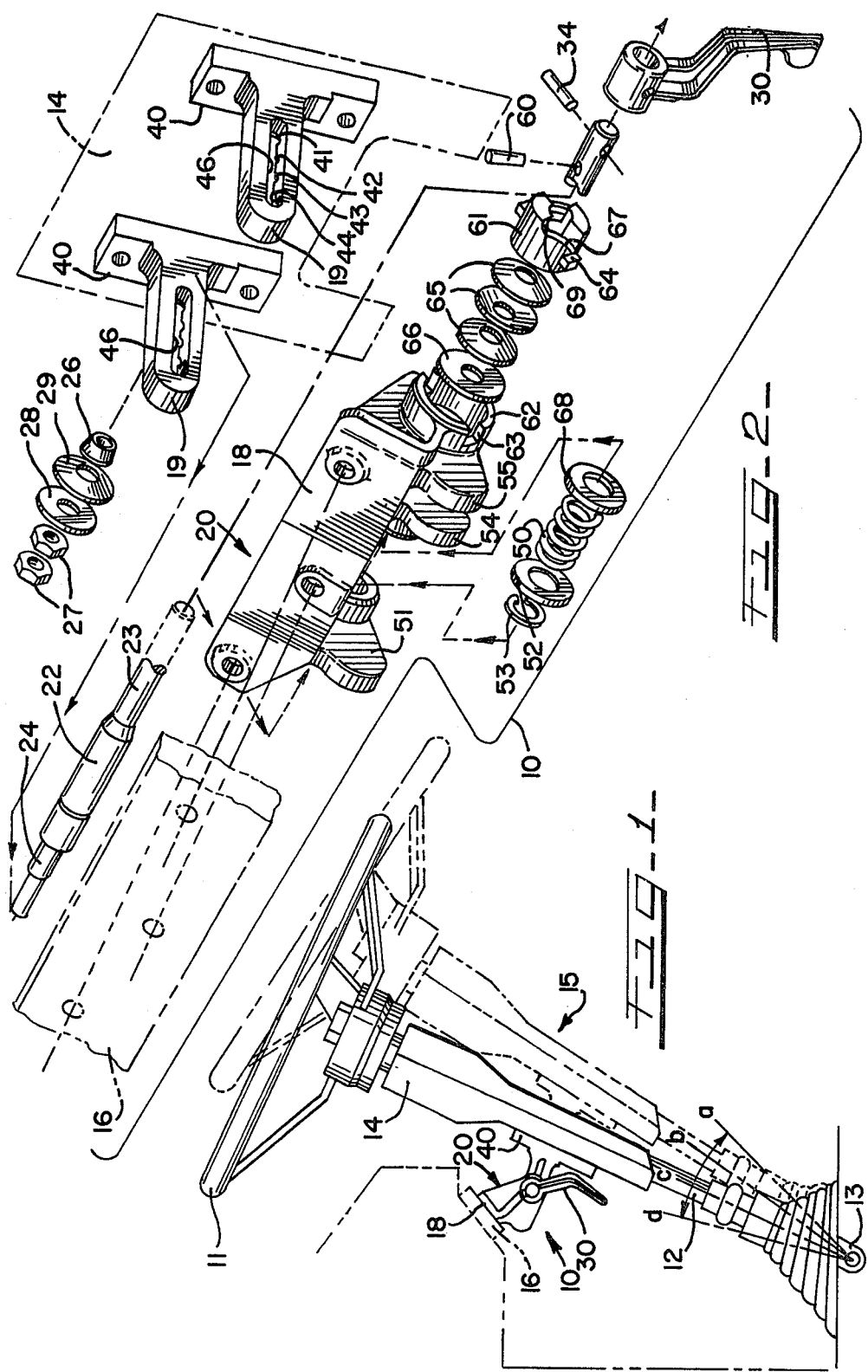

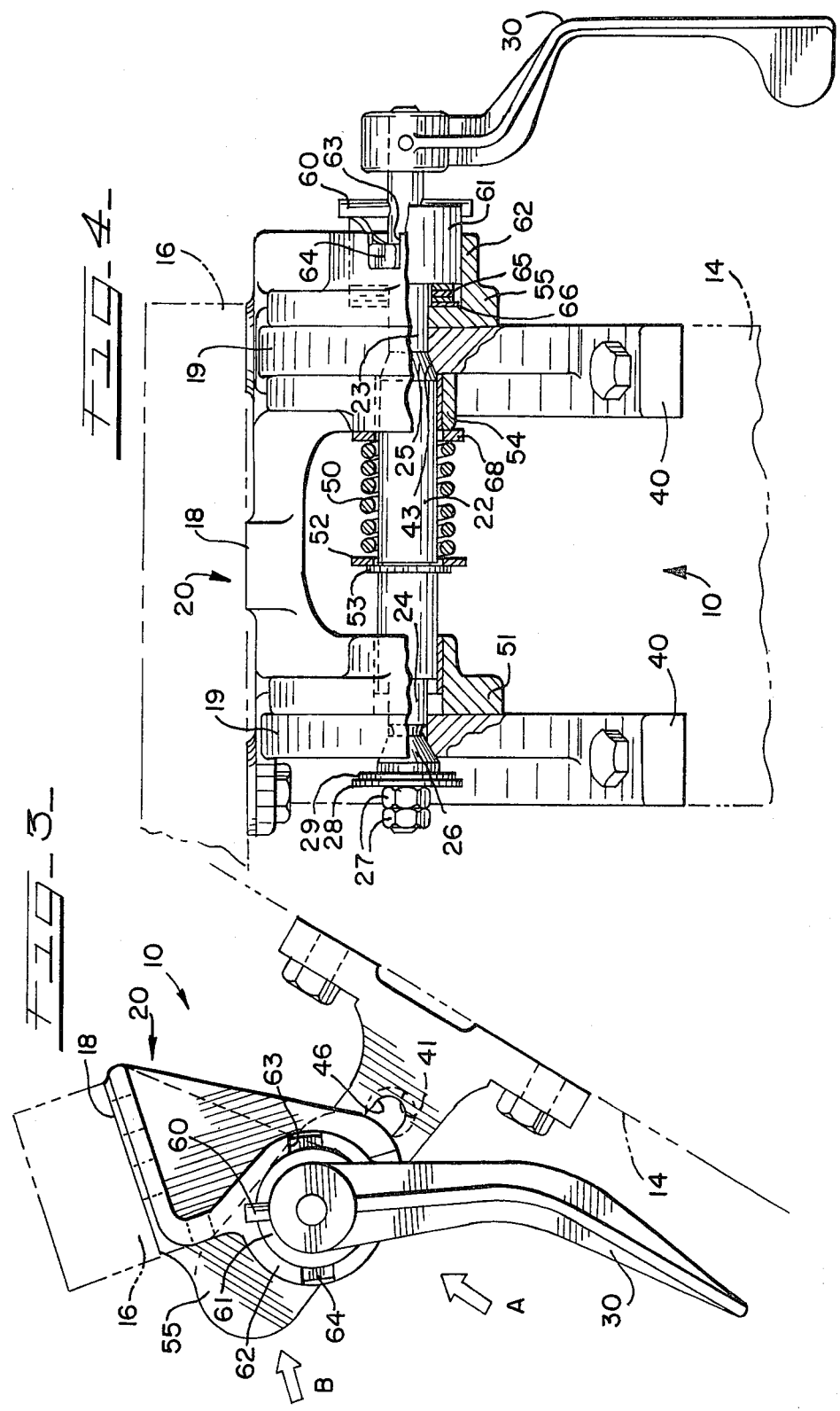

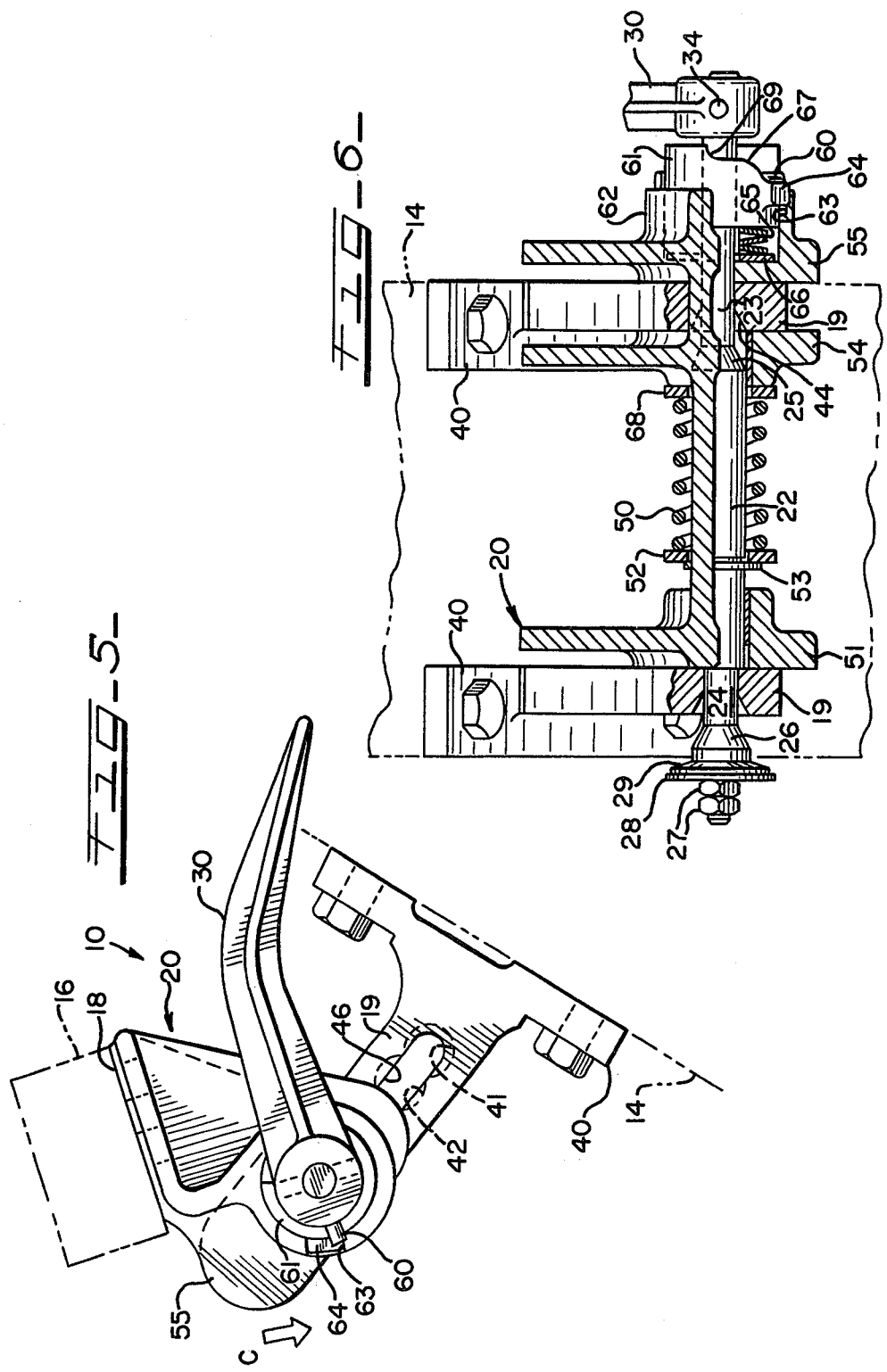

TILT STEERING COLUMN MECHANISM

CROSS-REFERENCE TO A RELATED APPLICATION

An application by Raymond L. Sylvester, assignor to the International Harvester Company, concurrently filed with my application, on May 29, 1979, under Ser. No. 42,745, is entitled "TILT STEERING COLUMN MECHANISM" and relates to my invention.

BACKGROUND OF THE INVENTION

My invention relates to a tilt steering column mechanism, for use in a commercial vehicle, in particular in a truck of the cab-over-engine or forward cab variety, which permits the tilting of the steering column in a fore-and-aft direction.

FIELD OF THE INVENTION

Tiltable steering columns have become quite popular, especially for commercial vehicles, such as trucks of the cab-over-engine or forward cab variety, wherein the driver's seat is situated nearly directly above the front axle and the steering wheel is disposed at a slight angle to a horizontal plane. The ability to tilt the steering column greatly enhances the comfort of the driver by permitting the operator to position the steering wheel in a comfortable driving position and by facilitating access to and egress from the driver's station.

BRIEF DESCRIPTION OF THE STATE OF THE ART

My invention is an improvement to the detent type of tilt steering column mechanisms, such as are shown in the following U.S. Pat. Nos.
4,018,101—Michalic—Apr. 19, 1977;
3,803,939—Schenten—Apr. 16, 1974; and
3,678,778—Groves—July 25, 1972.
In the prior structures, a detent mechanism is operable to engage a movable member having a plurality of holes, slots or teeth, each of which corresponds to a separate, discrete position of the steering column. I have provided a handle operated, rotary cam and pin follower actuated, frustoconical tilt steering column lock mechanism that mechanically locks and unlocks the tilt steering column in one planar pivotal movement as opposed to Michalic which requires two planes of pivotal movement; and one which provides a positive mechanical lock between the slideable bracket on the steering column and the stationary bracket on the vehicle cab frame, rather than the frictional clamping arrangements of Michalic and Schenten, or the spring force in combination with the release of the Bowden cable of Groves, and one which utilizes the conventional universal connection at the base of the tilt steering column for the tilt axis.

SUMMARY OF THE INVENTION

The tilt steering column mechanism, made in accordance with my invention, makes full use of a conventional fixed steering column assembly and the universal joint at the base thereof which allows the upper end supporting the steering wheel to swing fore-and-aft. Accordingly, my improved tilt steering column mechanism comprises a support bracket means connected to a vehicle cab frame for supporting the steering column above the universal joint connection. A slider bracket means is connected to the steering column which has arm means passing forwardly into the support bracket means for limiting tilting of the steering column to the fore-and-aft direction. Frusto-conical detent means are slideably mounted to the support bracket means and are movable transversely with respect to the steering column for locking the arm means of the slider bracket means to the support bracket means at selected frusto-conical detent receiving means which are provided on one lateral side of the arm means of the slider bracket means which correspond to one of several selectable fore-and-aft tilt positions of the steering column. First spring means are carried on the support bracket means and engage the frusto-conical detent means for moving the frusto-conical detent means out of engagement with the frusto-conical detent receiving means. A rotary cam means is resiliently mounted to the support bracket and has a cam follower pin fixed to the frusto-conical detent means. A second spring means, which is of lesser magnitude than and opposses the first spring means, urges the rotary cam means into engagement with the cam follower pin means and the frusto-conical detent means into engagement with the frusto-conical receiving means. A lever means is fixed to the frusto-conical detent means for moving the frusto-conical means into engagement with the frusto-conical detent receiving means by rotating the cam follower pin means along a rising cam land surface of the rotary cam means and loading the opposing spring means and for moving the frusto-conical detent means out from engagement with the frusto-conical detent receiving means by rotating the cam follower pin means in a reverse direction along a now falling cam land surface of the rotary cam means and releasing the loading on the opposing spring means whereby the first spring means moves the frusto-conical detent means out from the frusto-conical detent receiving means against the lesser force of the second spring means.

In particular the support bracket means comprise a base plate fixed to the vehicle cab frame and has three spaced-apart flange members which project forwardly from the base. The flange members each have at least one flat lateral side perpendicular to the base plate. The slider bracket means comprise two identical spaced-apart arm means each having a pedestal fixed to a base on the steering column and each having two parallel lateral flat sides which project forwardly from the pedestal and pass along side of the flat lateral sides of the flange members. The arm means each have an elongated slot on the identical lateral flat side and a plurality of uniformly spaced-apart frusto-conical holes on the indentical opposite lateral flat side which taper downwardly into the slot. The frusto-conical detent means comprise an elongated locking bar which has two longitudinally spaced-apart frusto-conical portions thereon and is slideably carried in matching transverse bores provided in each of the flat lateral sides of the flange members. The frusto-conical portions each taper downwardly in the same axial direction into an elongated anchor portion of a size which passes through the slot in each arm means thereby anchoring the respective arm means to the flange members of the support bracket means.

Further one frusto-conical portion is slideably mounted to one end of the locking bar and a third spring means cooperating with the first spring means is provided on the one end of the locking bar for resiliently connecting the frusto-conical portion thereto and for axially positioning both frusto-conical portions in respective aligned frusto-conical holes in the arm means.

The rotary cam means includes a cup connected to the side opposite of the flat lateral side of one flange memer. A pair of diametrically opposite slots are provided on the cup and extend axially from the rim towards the bottom. The rotary cam means has a closed bottom cylindrical body portion which slip fits inside the cup and has radially projecting lugs which are slip fit in the slots. The cup and the rotary cam means each have a hole centered in the bottom thereof, through which the locking bar passes. The second spring means comprise a thrust washer and a plurality of spring washers sleeved over the locking bar between the bottom of the cup and the outside bottom of the rotary cam means. The cam follower pin means is fixed to an end portion of the locking bar which passes through the holes in the bottoms of the cup and rotary cam means, and the handle is fixed to the end of the locking bar adjacent the cam follower pin means. The first spring means comprise a compression spring which is sleeved over the locking bar and which has one end contacting one flange member on the side opposite of the flat lateral side and the other end contacting a flat washer which is sleeved over and connected tc the bar. The third spring means comprise a pair of jam nuts screwed onto a threaded end portion of the locking bar against a flat washer which abuts a spring washer which in turn abuts the large end of the slideably mounted frusto-conical portion.

In order to tilt the steering column to another position, the frusto-conical portions on the locking bar are unseated from the frusto-conical receiving holes in the slotted arm means of the slider bracket means by rotating the cam follower pin means, which is keyed to the locking bar, by means of the handle, which is also keyed to the locking bar, from the raised land cam surface to the lowered land cam surface, thereby releasing the loading on the opposing spring means whereupon the spring means of greater magnitude causes the locking bar to slide and unseat the frusto-conical detent portions from the frusto-conical detent receiving holes against the bias of the spring means of lesser magnitude. The anchor portions of the locking bar now extend across the entire width of the slotted arm means of the slider bracket means so that the slotted arm means of the slider bracket means are free to slide across the anchor portions on the locking bar and the steering column is free to pivot fore-and-aft, about the axis of the universal connection at the base of the steering column, to the selected new position of the steering wheel. Once the new position is reached, the handle, which is keyed to the locking bolt, is rotated back to its original position thereby rotating the cam follower pin means of the rotary cam means, which is also keyed to the locking shaft, from the lowered land cam surface to the raised land cam surface, drawing the frusto-conical detent portions on the locking bar into seating engagement with the new frusto-conical detent receiving holes or receptacles corresponding to the new tilted position of the steering wheel column and compressing or loading the opposing spring means which firmly hold the keyed cam follower pin means in a locking notch in the raised land cam surface and also lock the keyed handle in place.

The spring means of greater magnitude is positioned on the one lateral side of the slider bracket means which is provided with the uniformily spaced frusto-conical detent receiving holes or receptacles, which taper into the elongated slot, and act on the locking bar in one axial direction and the spring means of lesser magnitude is positioned on the other lateral side and act on the rotary cam means which is sleeved over the locking bar and is resiliently anchored in a cup on the support bracket means and in turn also act on the locking bar in the opposite axial direction through the cam follower pin means which is keyed to the locking bar and is in contact with the undulating land surface on the rotary cam means.

BRIEF DESCRIPTION OF THE DRAWING

FIG. 1 is a side elevation view of the tilt steering column mechanism incorporated on a steering wheel assembly;

FIG. 2 is an illustration of the major parts of the tilt steering column mechanism, with the omission of minor hardware for purpose of clarity;

FIG. 3 is an enlarged side view of the tilt steering column with the handle in the locked position;

FIG. 4 is a partial sectional view of the tilt steering mechanism scanning in the general direction and between the arrows A and B in FIG. 3;

FIG. 5 is similar to FIG. 3 but shows the handle in the unlocked position and the slider bracket means shifted to a new location; and FIG. 6 is similar to FIG. 4 but taken in the general direction of arrow C in FIG. 5.

DESCRIPTION OF THE PREFERRED EMBODIMENT

A tilt steering column mechanism is generally designated 10 in the various figures of the drawing. In FIG. 1, a conventional steering column assembly 15 is shown in one tilted position c in solid lines and in another tilted position b in phantom lines and includes a steering wheel 11, at the top of the steering column 12, the universal joint 13 at the base, and a two-piece steering column base housing 14. A stationary support bracket means 20 is fixed to the cab supported frame 16 and has three laterally spaced apart flanges 51, 54, 55 that extend forwardly and upwardly. The laterally spaced-apart flanges 51, 54, 55 have aligned co-axial bores corresponding in size to the various sizes of the slideable portions on the elongated locking bolt 22. Two spaced-apart anchor portions 23, 24 have sizes corresponding to the width of the slots 46,46 in the two identical slider bracket means 40,40, which may be constructed from one piece or in two pieces as shown, and anchor the slider bracket means 40,40 to the support bracket means 20. Two frusto-conical detent portion means 25, 26 taper downwardly into the two anchor portions 23, 24. The one frusto-conical portion 26, on the left outboard side of the locking bar 22, is sleeved over a threaded end portion of the locking bar 22, and is resiliently held in place by a pair of jam nuts 27 which abut against a flat disk washer 28, which in turn abuts against a spring washer 29, which abuts against the large side of the slideably mounted frusto-conical portion means 26. The proper seating of the frusto-conical detent portion means 25, 26 in complementary frusto-conical detent receiving holes or receptacles 41, 42, 43 or 44 in the slotted arm means of the slider bracket means 40,40 is controlled by adjusting the jam nuts 27 and the pressure applied on the spring washer 29 pressing against the large end of the slideably mounted frusto-conical portion means 26.

The opposite end of the locking bar 22 is connected to the operating handle 30 by means of a pin 34 and carries a cam follower pin means 60 which contacts the undulating land surface 67 of rotary cam means 61, which is slideably mounted in a cup 61 on the lateral side of flange 55. The cup 61 is provided with two axially extending slots 63 which cooperate with two lugs 64 on the circumference of the rotary cam means 61. Three identical spring washers 65 and a thrust ring washer 66 urge the undulated land surface 67 into contact with the cam follower pin means 60, which is keyed to the locking bar 22.

The slider bracket means 40,40 comprise two identical slotted slider arm means 19,19, each of which have a pedestal fixed to a base 14 on the steering column 12. The arm means 19,19 pass forwardly and upwardly along side one flat lateral side of each of the three flange members 51, 54, 55 on the support bracket means 20. Since the slotted slider bracket arm means 19,19 are identical only the one on the right will be described in detail. An elongated slot 46 is provided in the projecting arm means 19 which respectively passes over the one right anchor portion 23 on the locking bar 22 and is anchored thereby to the two adjacent spaced-apart flanges 54 and 55 on the support bracket means 20. Four uniformly spaced frusto-conical detent receiving holes 41, 42, 43, 44 taper downwardly into the slot 46 and each form a seat for the right frusto-conical detent portion 25 on the elongated locking bar 22. The indentical frusto-conical detent receiving holes in the left arm means 19 also, each form a seat for the left frusto-conical detent portion 26.

A coil spring 50, of greater magnitude than the cluster of three spring washers 65 that act on the rotary cam means 61, is sleeved over the mid-section of the rod 22 between the left outer and inner flanges 51, 54 and is compressed against a thrust washer 68, which abuts the inner flange 54 and a flat washer 52 which is anchored to the locking bar 22 by a snap ring 53 seated in a groove provided in the locking bar 22. The cam follower pin means 60, when seated in the notch 69 provided on the raised land cam surface 67 compresses the cluster of three spring washers 65 and the spring 50 and firmly seats the cylindrical body of the rotary cam means 61 in the cup 62 and both frusto-conical detent portion means 25, 26 in the one selected axially aligned pair of frusto-conical holes 41, 42, 43 or 44 in the two arm means 19,19 and also compresses the coil spring 50 and the spring washer 29 on the threaded end of the locking bar 22.

MODE OF OPERATION

In order to pivot the steering wheel 11 to any one of the three other tilted positions a, b, or d, from the c position shown in FIG. 1, handle 30 is pulled rearwardly or rotated counterclockwise from the engaged or locked position shown in FIG. 3, to the disengaged or unlocked position shown in FIG. 5. The cam follower pin means 60 rides downwardly on the falling land cam surface 67 releasing the pressure or loading on all three spring means 29, 50, 65. The one spring means 50, together with the second spring means 29, push against the locking bar 22 thereby shifting the locking bar 22 to the left against the action of the third spring means 65 until both frusto-conical detent portion means 24, 25 are each unseated from their respective frusto-conical detent receiving holes 41 in the two indentical slider bracket arm means 19,19 and the rotary cam means 61 is shifted to the right towards the arm of the cup 62 and is prevented from rotating by the lugs 64 in the track slots 63.

The driver or operator now pivots or tilts the steering column 12 to the selected new position, for instance to the dash line b position of FIG. 1, about the axis of the universal connection 13. The slot 46 in each of the slider bracket arm means 19,19 slides over the respective anchor portions 23, 24 on the locking bar 22, thereby permitting the slider bracket arm means 19,19 to slide rearwardly alongside the one flat lateral side of each of the flanges 51, 54, 55 on the base 18 of the support bracket means 20 and axially align the frusto-conical detent portion means 25, 26 with the one pair of frusto-conical detent receiving holes 44 corresponding to the selected b position of the steering column 12. Once the selected b position is reached, the driver or operator returns or rotates the handle 30 clockwise back to the engaged position shown in FIG. 3. The cam follower pin means 60 riding upwardly over the now rising cam land surface 67 pulls the locking bar 22 and the frusto-conical portions 25,25 to the right into seating engagement with the b position pair of frusto-conical detent receiving holes 44, the rotary cam means 61 is shifted to the left back into the cup 62, and the three spring means 28, 50, 65 are again loaded or compressed firmly holding the cam follower pin means 60 in the notch 69 and the frusto-conical detent portions 25,26 in their respective frusto-conical detent receiving holes 44,44 in the arm means 19,19.

The embodiment of the invention in which an exclusive property or priviledge is claimed are defined as follows:

1. An improved tilt steering column mechanism for a steering column tiltable about a universal joint at the base thereof, comprising:

a support bracket means connected to a vehicle cab frame for supporting the steering column above the universal joint connection;

a slider bracket means connected to the steering column and having arm means passing forwardly into the support bracket means for limiting tilting of the steering column to the fore-and-aft direction;

frusto-conical detent means slideably mounted to the support bracket means and movable transversely with respect to the steering column for locking arm means of the slider bracket means to the support bracket means at selected frusto-conical detent receiving means provided on one lateral side of the arm means corresponding to one of several selectable fore-and-aft tilt positions of the steering column;

first spring means carried on the support bracket means and engaging the frusto-conical detent means for moving the frusto-conical detent means out of engagment with the frusto-conical detent receiving means; and a rotary cam means slideably mounted to the support bracket means, a cam follower pin means fixed to the frusto-conical detent means, and a second spring means of lesser magnitude than and opposing the first spring means urging the rotary cam means into engagement with the cam follower pin means and the frusto-conical detent means into engagement with the frusto-conical detent receiving means;

lever means fixed to the frusto-conical detent means for moving the frusto-conical detent means into engagement with the frusto-conical detent receiving means by rotating the cam follower pin means along a rising cam land surface of the rotary cam means and loading the opposing spring means and for moving the frusto-conical detent means out from engagement with the frusto-conical detent receiving means by rotating the cam follower pin means in a reverse direction along a now falling cam land surface of the rotary cam means and releasing the loading on the opposing spring means whereby the first spring means moves the frusto-conical detent means out from the frusto-conical detent receiving means against the lesser force of the second spring means.

2. The improved tilt steering column mechanism according to claim 1, wherein, the support bracket means comprise a base plate fixed to the vehicle cab frame and having three spaced-apart flange members projecting forwardly therefrom, the flange members each having at least one flat lateral side perpendicular to the base plate; and wherein, the slider bracket means comprise two identical spaced-apart arm means each having a pedestal fixed to a base on the steering column and each having two parallel lateral flat sides projecting forwardly from the pedestal and passing through alongside of the flat lateral side of each of the flange members, the arm means each having an elongated slot on the identical lateral flat side and a plurality of uniformly spaced-apart frusto-conical holes on the identical opposite lateral flat side tapering downwardly into the slot and comprising the frusto-conical detent receiving means; and wherein, the frusto-conical detent means comprise an elongated locking bar having two axially spaced-apart frusto-conical detent portions thereon slideably carried in matching transverse bores provided in each of the flat lateral sides of the flange members, the frusto-conical detent portions each tapering downwardly in the same axial direction into an elongated anchor portion of a size passing through the slot in each arm means anchoring the respective arm means to the flange members of the support bracket means.

3. The improved tilt steering column mechanism according to claim 2, wherein the rotary cam means further includes a cup connected to the side opposite of the flat lateral side of the one flange member and having a pair of slots on diametrically opposite points extending axially from the rim towards the bottom, the rotary cam means having a closed bottom cylindrical body portion slip fitted inside the cup and having radially projecting lugs on diametrically opposite points slip fitted in the slots, the cup and the rotary cam means each having a hole centered in the bottom thereof through which the locking bar passes, and wherein the second spring means comprise a thrust washer and a plurality of spring washers sleeved over the locking bar between the bottom of the cup and the outside bottom of the rotary cam means, and the cam follower pin means is fixed to an end portion of the locking bar which passes through the holes in the bottoms of the cup and rotary cam means, and the handle is fixed to the end of the locking bar adjacent the cam follower pin means.

4. The improved tilt steering column mechanism according to claim 2 or 3, wherein, one frusto-conical detent portion is slideably mounted to one end of the locking bar, and a third spring means acting in cooperation with the first spring means is provided on the one end of the locking bar for resiliently connecting the frusto-conical detent portion thereto and for axially positioning both frusto-conical detent portions in respective aligned frusto-conical detent receiving holes in the arm means.

5. The improved tilt steering column mechanism according to claim 4 wherein, four uniformly spaced-apart frusto-conical holes are provided in each arm.

6. The improved tilt steering column mechanism according to claim 5 wherein, the first spring means comprise a compression spring sleeved over the locking bar and having one end contacting one flange member on the side opposite the flat lateral side and the other end contacting a flat washer sleeved over and connected to the locking bar.

7. The improved tilt steering column mechanism according to claim 6 wherein the third spring means comprise a pair of jam nuts screwed onto a threaded end portion of the one end of the locking bar against a flat washer abutting a spring washer in turn abutting the large end of the slideably mounted frusto-conical detent portion.

* * * * *